United States Patent [19]

Kreeger et al.

[11] E Patent Number: Re. 32,223

[45] Reissued Date of Patent: Aug. 12, 1986

[54] MULTILEVEL STACKING CONTAINER

[75] Inventors: Elsmer W. Kreeger, Howell, Mich.; Edward L. Stahl, Osage Beach, Mo.

[73] Assignee: Pinckney Molded Plastics, Inc., Howell, Mich.

[21] Appl. No.: 699,655

[22] Filed: Feb. 8, 1985

Related U.S. Patent Documents

Reissue of:

[64] Patent No.: 4,423,813
Issued: Jan. 3, 1984
Appl. No.: 381,072
Filed: May 24, 1982

[51] Int. Cl.[4] ..... B65D 21/04
[52] U.S. Cl. ..... 206/506; 206/507
[58] Field of Search ..... 206/505, 506, 507

[56] References Cited

U.S. PATENT DOCUMENTS

| | | | |
|---|---|---|---|
| 2,765,099 | 10/1956 | Lively | 206/506 |
| 3,220,603 | 11/1965 | Bromley | 206/506 |
| 3,951,265 | 4/1976 | Carroll | 206/506 |
| 4,106,623 | 8/1978 | Carroll et al. | 206/506 |
| 4,109,798 | 8/1978 | Clipson et al. | 206/506 |
| 4,270,678 | 6/1981 | Draden | 206/506 |

*Primary Examiner*—George E. Lowrance
*Attorney, Agent, or Firm*—Basile, Weintraub & Hanlon

[57] ABSTRACT

A multilevel stacking container is nestable in a like container when in like end to like end relationship thereto and stackable in an intermediate level relative to the underlying container upon reversal to a like end to unlike end relationship. A stacking shelf is hingedly mound on each end of the container between a stored position, which accommodates nesting or intermediate level stacking of like containers, and a support position which establishes a high level stacking configuration in which the upper of two stacked containers is stably supported at a substantially higher level relative to the underlying container as compared to the intermediate level stacked relationship.

6 Claims, 10 Drawing Figures

MULTILEVEL STACKING CONTAINER

Matter enclosed in heavy brackets [ ] appears in the original patent but forms no part of this reissue specification; matter printed in italics indicates the additions made by reissue.

BACKGROUND OF THE INVENTION

The present invention relates to a multilevel stacking container of a type frequently employed by bakeries, for example, wherein like containers may selectively be stacked in stable relationship with the upper of two containers being supported at any one of three selected levels relative to the next underlying container. Conventionally in such containers, the lowermost stacking level is referred to a nesting or nested relationship normally employed to minimize vertical stacking height when the containers are empty, while an intermediate level and high level stacking relationship are selectively employed in accordance with the height of products contained in the lower of the two containers to provide a minimum stack height while avoiding crushing of products contained in an underlying container.

The present invention is especially directed to a type of container which employs a pivoted or hingedly mounted stacking shelf which, when located in a support position, establishes the high level stacking relationship by providing support for stacking rails or feet on an overlying container. When pivoted to a stored position, the stacking shelf is stored clear of the stacking rails or feet on an uppermost container so that the uppermost container may be selectively stacked in the lower intermediate position or be fully nested. Containers of this general type are known in the prior art; see, for example, U.S. Pat. No. 4,106,623, U.S. Pat. No. 3,951,265 (which employs a bail, rather than a shelf) and U.S. Pat. No. 4,109,791.

The present invention is especially directed to improvements in the stacking shelf and associated structure.

SUMMARY OF THE INVENTION

In accordance with the present invention, a generally rectangular container is formed with lower rails or webs extending along two opposed end walls of the rectangular bottom. Support webs, which are vertically inclined, are secured at their inner sides to the outer side of the lower rail, and an upper rail in turn is mounted upon the outer side of the support webs. Thus the upper rail is horizontally offset outwardly from the lower rail by the thickness of the support webs. Stacking feet are formed at the lower end of each support web, a stacking seat is formed at an intermediate elevation on each of the support webs, and the upper end of each support web defines a support platform. The upper rail projects vertically above the support platform portions of the support webs and is recessed at its inner side to receive a hinged stacking shelf which extends the entire length of the end wall. When located within the recess, the stacking shelf is stored within the thickness of the upper rail; hence, the stacking feet of a like container may pass downwardly through or between the opposed stacking shelves into stacked relationship upon the support seats of an underlying container. The inclination of the support webs at opposite ends of the crate differs, in a known manner, so that when two containers are stacked in like end to like end relationship, the inclined webs of the upper container lie against the inclined webs of the lower container to establish the fully nested position of the two containers. When the two containers are stacked in a like end to unlike end relationship, the stacking feet of the upper container are received upon the stacking seats of the lower container to establish the intermediate level stacked position. When the stacking shelves are located in their support position, the shelves provide a support which locates an overlying container in a high level stacked position, regardless of the end wall orientation of the two containers.

A detent arrangement is provided to releasably retain the stacking shelf in its stored position; an opening through the upper rail provides access to the stacking shelf so that it may be shifted to its support position as by a pusher member employed in an automatic container handling apparatus.

Other objects and features of the invention will become apparent by reference to the following specification and to the drawings.

IN THE DRAWINGS

Figure 1:
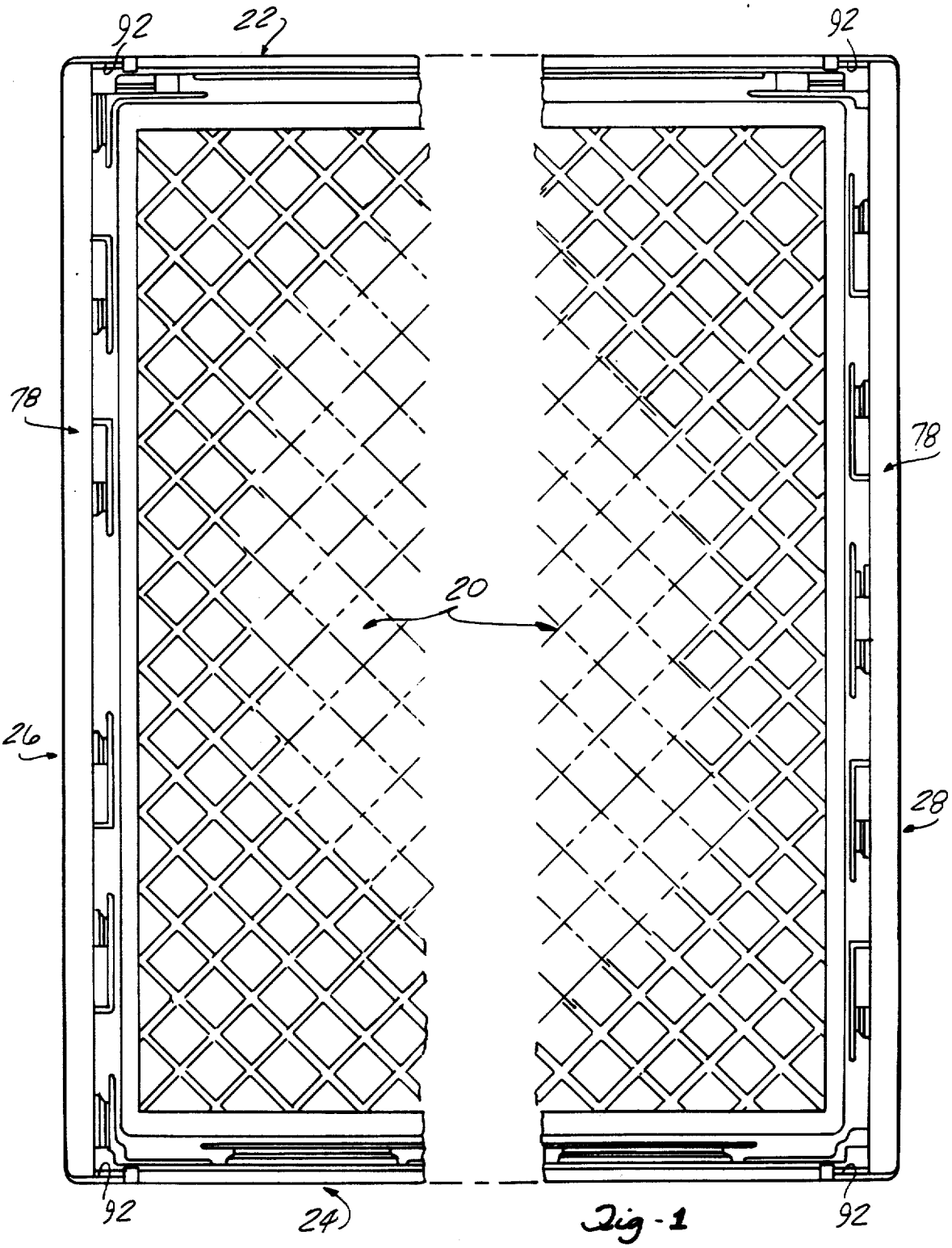
FIG. 1 is a top plan view, partially broken away, of a container embodying the present invention.

Referring first to FIG. 1, a container embodying the present invention includes a rectangular bottom designated generally 20, which may be of an open grid work, first and second side walls 22, 24 which are fixedly secured to and project upwardly from the opposed sides of bottom 20, and first and second end walls 26, 28 fixedly secured along the opposed ends of bottom 20 and to the opposed side walls 22, 24 at the corners of the container. The bottom, side and end walls are formed of a suitable thermoplastic material, such as polyethylene, and fixedly secured to each other to form a unitary structure.

Figure 2:
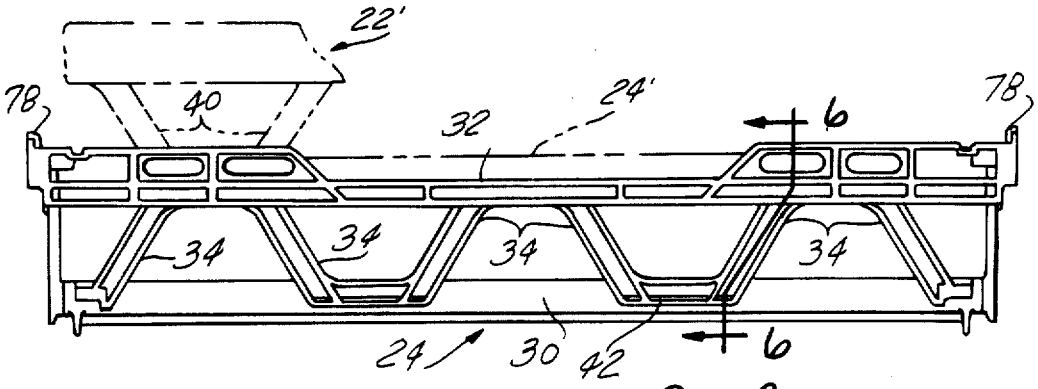
FIG. 2 is a side elevational view of one side wall of the container of FIG. 1.
Figure 3:
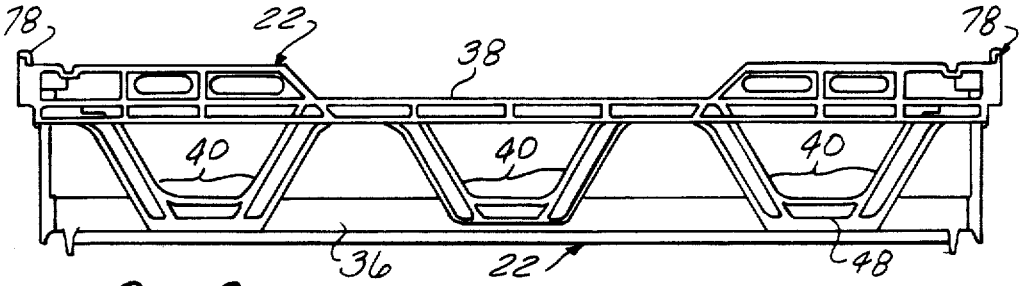
FIG. 3 is a detail side view of the opposite side of the container of FIG. 1.

Referring now particularly to FIGS. 2 and 3, it is seen that the side walls 22, 24 are of related, but different, structure. Side wall 24 includes a lower rail 30 and an upper rail 32 which is supported above lower rail 30 by a series of alternately inclined support webs 34. Similarly, side wall 22 includes a lower rail 36 and an upper rail 38 which is supported above lower rail 36 by a series of alternately inclined support webs 40. From a comparison of FIGS. 2 and 3, which are vertically aligned with each other, it is seen that the direction of inclination of the support webs 54 of side wall 24 is opposite, in each case, to the direction of inclination of the corresponding support web 40 of the opposite side wall 22. As indicated in broken line at the left-hand portion of FIG. 2, when two containers are stacked with an end wall 22 (partially indicated at 22' in FIG. 2) located above an end wall 24 of an underlying container, the lower ends of the support webs 40' of the upper container are aligned with the upper ends of the corresponding support webs 34 of the lower container. When, as indicated in the central portion of FIG. 2, two containers are stacked with the end wall 24' of the upper container located above a corresponding end wall 24 of the lower container, the support webs 34' of the upper container will nest, as indicated in broken line in FIG. 2, with the corresponding support webs 34 of the lower container.

Figure 6:
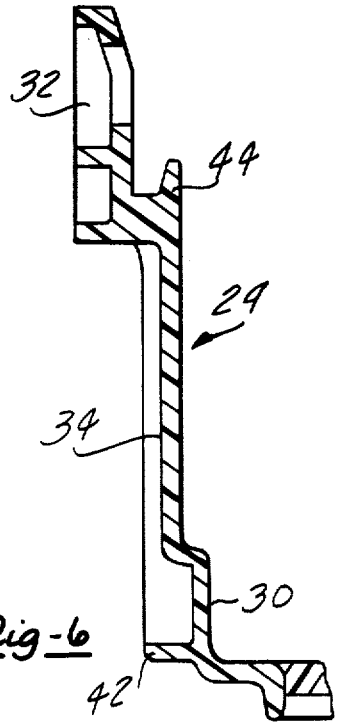
FIG. 6 is a detail cross-sectional view taken on the line 6—6 of FIG. 2.

Referring to the cross-sectional view of FIG. 6, it is seen that the upper rails 32 of side walls 24 are horizontally offset from the lower rails 30 by the thickness of support webs 34. As best seen in FIG. 2, the lower ends of alternate pairs of support webs 34 are interconnected by a horizontal web portion 42; a generally similar horizontal web 44 interconnects the convergent upper end pairs of support webs 34, the upper horizontal web 44 being shown in FIG. 6.

A cross-sectional view taken on the line 6A—6A of FIG. 3 would have a configuration precisely similar to that of FIG. 6, the adjacent convergent lower end pairs of the support webs 40 being interconnected by horizontal web sections 46, similar to the webs 42 of side walls 24, and an upper web section analogous to webs 44, not shown, interconnecting the convergent upper end pairs of support webs 40. Thus, when two containers are stacked in a like side wall to unlike side wall relationship (as at the left-hand end broken line showing of FIG. 2), the lower horizontal webs 46 of the upper container rest upon the upper horizontal webs 44.

Referring now to FIGS. 4, 5, 7 and 8, end wall 26 is formed with a lower rail 48, a plurality of inclined support webs 48, and an upper rail 50. As best seen in the cross-sectional view of FIG. 7, support webs 48 are mounted on the outer side of lower rail 46, while upper rail 50 is mounted on the outer side of support webs 48. Thus, the upper webs 50 are horizontally offset from lower rails 46 by the thickness of support webs 48. Similarly, end walls 28 are formed with a lower rail 52, inclined support webs 54 and an upper rail 56, whose cross-sectional configuration is similar to the corresponding structure described in connection with end wall 26. As was the case with side walls 22, 24, the direction of inclination of the support web 48 and 54 of the opposed end walls 26 and 28 is reversed for corresponding webs.

Figure 4:
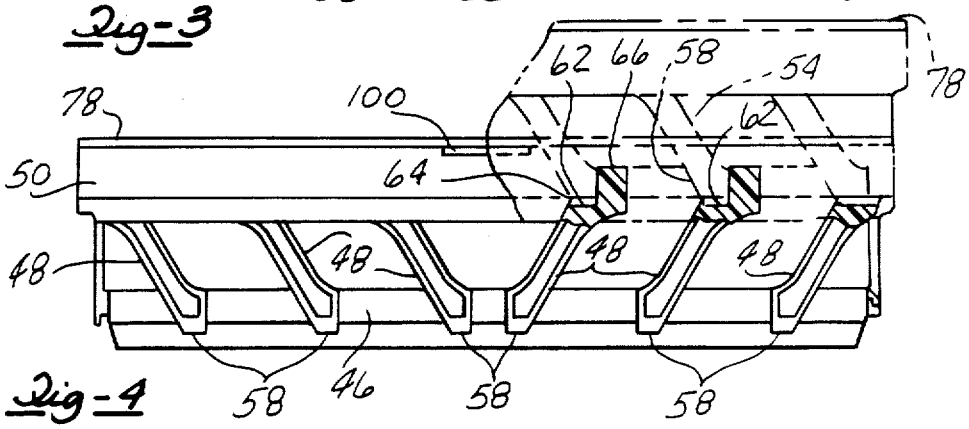
FIG. 4 is a detail side view of one end wall of the container of FIG. 1, with certain parts broken away, or shown in section.
Figure 5:
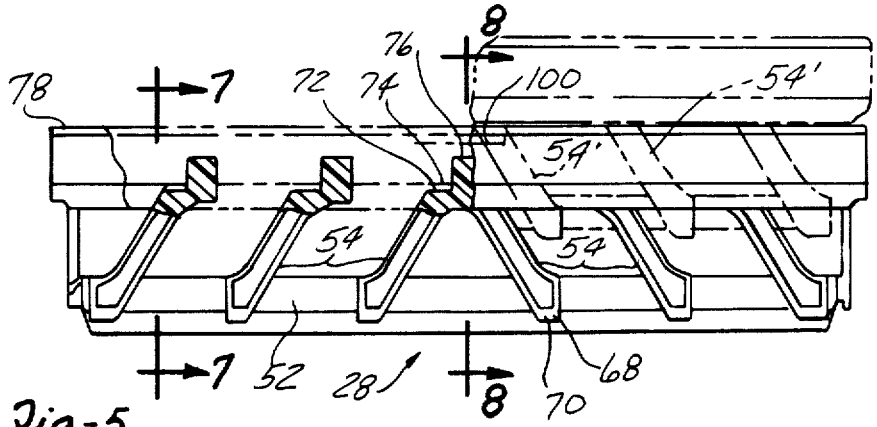
FIG. 5 is a detail side elevational view of the opposite end wall of the container of FIG. 1, with certain parts broken away, or shown in section.
Figure 7:
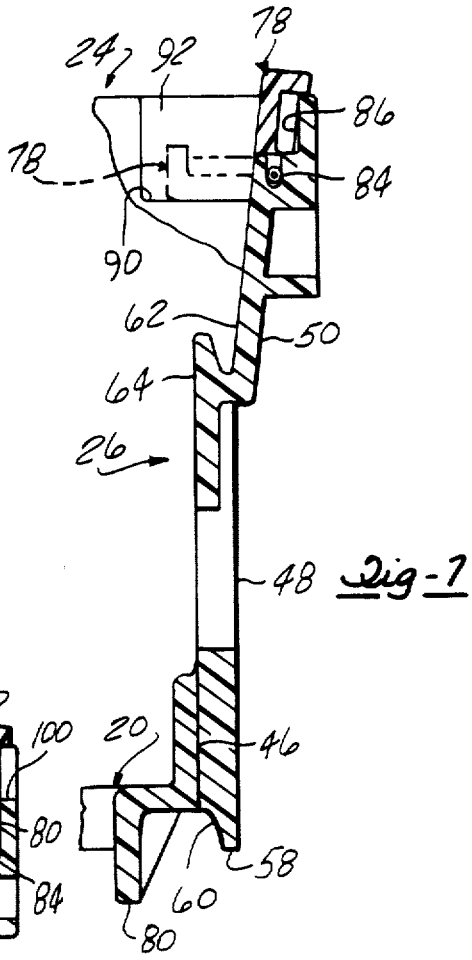
FIG. 7 is a detail cross-sectional view taken on the line 7—7 of FIG. 5.

Referring now particularly to FIGS. 4 and 5, the lower ends of each of support webs 48 of end wall 26 are formed with a flat support foot 58 which, as best seen in FIG. 7, has a recess 60 at its rearward or inner side. Near the upper end of each support web 48, a flat support seat 62 is formed (FIG. 4), the inner side of support seat 62 being provided with a vertically projecting flange 64. As best seen in FIG. 7, the support foot and recess 60 at the bottom of each support web 48 is complementary in cross section to the support seat 62 and flange 64 formed at an upper portion of the support web. The upper end of each support web 48 projects upwardly in a fairly substantial distance above the support seat 62 and terminates at its upper end in a flat support platform 66. Similarly, each of the support webs 54 on end walls 28 is formed at its lower end with a horizontal support seat 68 having a recess 70 behind the foot, as indicated in FIG. 5. Support seats 72, with corresponding flanges 74 and an upwardly projected support platform 76, are formed at the upper end of each support web 54. The support feet, support seats and support platforms of the support webs 54 are identical in cross section to the corresponding support feet, support seats and support platforms of the webs 48.

When two containers are stacked in a like end wall to unlike end wall relationship, as indicated in broken line in the right-hand portion of FIG. 4, the support feet 58 of the upper container are seated upon the support seats 62 of the lower container to establish the intermediate stacked position of the two containers. When two containers are stacked in like end wall to like end wall relationship, as indicated in broken line at the right-hand side of FIG. 5, the support webs 54' of the upper container nest in the corresponding support webs 54 of the lower container to establish the fully nested position of the two containers.

Referring now particularly to FIGS. 1 and 7—10, each of end walls 26 and 28 includes a pivoted shelf, designated generally 78, which extends the entire length of each end wall along the upper portion of upper rim 50. Each shelf 78 is hingedly mounted upon the upper rim with a piano-type hinge, the shelf 78 being formed with spaced gudgeons 80 integrally formed along one edge of the shelf which fit between corresponding gudgeon portions 82 (FIG. 7) integrally formed on upper rim 50. An elongate hinge pintle 84 passes through the respective gudgeons and through openings, not shown, in the adjacent side walls.

Figure 8:
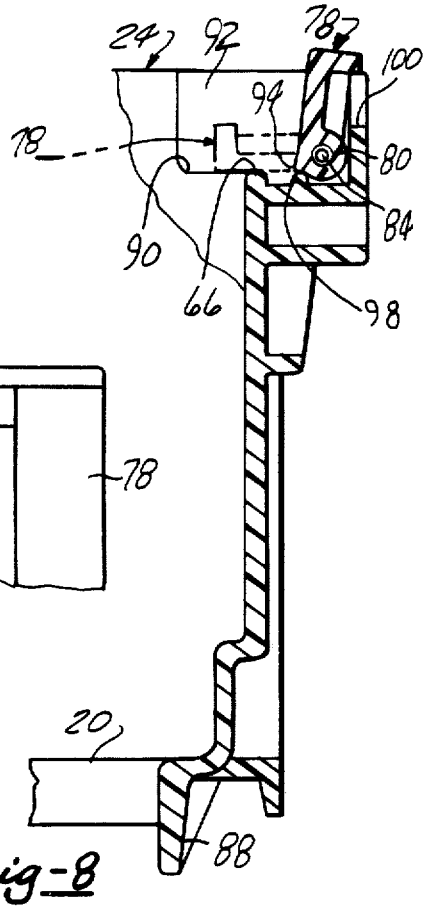
FIG. 8 is a detail cross-sectional view taken on the line 8—8 of FIG. 5.
Figure 10:
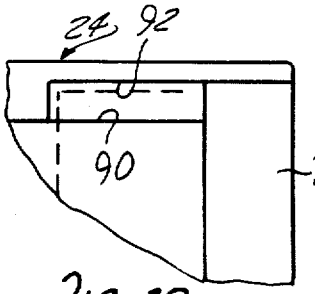
FIG. 10 is a detail top plan view of a corner of the container.
Figure 9:
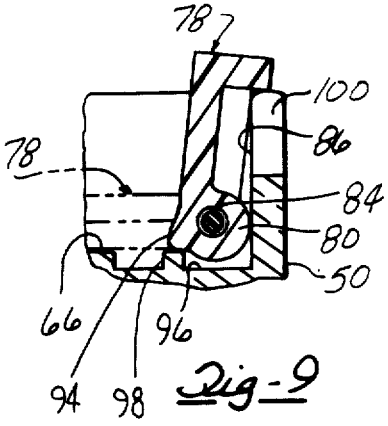
FIG. 9 is an enlargement of a portion of the cross-sectional view of FIG. 8.

The upper portion of upper rim 50 is formed with a recess 86 which extends along its inner surface and downwardly from the upper edge of upper rim 50 so that, when shelf 78 is located in a stored position shown in full line in FIGS. 7-9, shelf 78 lies within the envelope of the inner surface of upper rim 50, thus enabling stacking of a like container in either of the intermediate stacked or nested positions referred to above.

As indicated in broken line FIGS. 7 and 8, shelf 78 may be pivoted from the stored position shown in full line in these figures to a support position indicated in broken line in which the shelf 78 rests upon the support platforms 66 (or 76 in the case of end wall 28) and projects horizontally inwardly of the container across the general plane of support webs 48. When in this position, the shelf 78 provides a support surface which will supportingly engage a stacking rail 88 formed on the bottom 20 of the container to support an overlying container in a high level stacking relationship to an underlying container. The shelf 78, when in the broken line support position of FIGS. 7 and 8, is not only supported beneath by the spaced support platforms 66 of the end wall support webs, but is also supported at each end by a support surface 90 constituted by a recess 92 formed at the opposite ends of each of side walls 22 and 24.

To releasably retain the shelves 78 in their upright position, a radially projecting rib 94 is integrally formed, preferably only in the central gudgeon 80 of each of shelves 78. As best seen in the enlarged view of FIG. 9, the recess 86 in upper rim 50 is formed with a depression 96 in its bottom which, for the major part, lies at a distance from hinge pintle 84 which is greater than the radial distance from pintle 84 to the outermost portion of rib 94. An upwardly projecting lip 98 is formed which underlies and supports rib 94 when shelf 78 is in its stored position shown in FIG. 9. The interference between lip 98 and rib 94 provides a detent which releasably retains shelf 78 in the stored position illustrated in FIG. 9.

To enable efficient shifting of shelves 78 from the stored position of FIGS. 7–9 to the support position indicated in broken line in FIGS. 7 and 8 by automatic container handling equipment, a notch 100 is cut downwardly from the upper edge of upper rim 50 to provide access by a pusher member which, upon passage inwardly through notch 100, swings the shelf to its support position. The notch 100 (see FIGS. 4 and 5) is generally longitudinally coextensive with that gudgeon of shelf 78 upon which the projecting detent rib 94 is located.

While one embodiment of the invention has been described in detail, it will be apparent to those skilled in the art that the disclosed embodiment may be modified. Therefore, the foregoing description is to be considered exemplary rather than limiting, and the true scope of the invention is that defined in the following claims.

We claim:

1. In a multilevel stacking container adapted to be stacked on a like container at any one of a plurality of different levels relative thereto, said container including a rectangular bottom, and first and second end walls fixedly secured to and projecting upwardly from respective opposite [ends] *end edges* of said bottom; the improvement wherein each of said end walls comprises [a web-like lower rail fixedly secured to said bottom,] a web-like upper rail vertically spaced above said [lower rail] *bottom* , a plurality of support webs each fixedly secured at *the inner side of* its lower end to the outer side of said [lower rail] *bottom* and fixedly secured at its upper end to the inner side of said upper rail whereby said upper rail is offset outwardly from said [lower rail] *end edge of said bottom* by the thickness of said support webs, a support foot at the lower end of each support web, a support platform at the upper end of each support web spaced downwardly from the upper edge of said upper rail and horizontally offset from the support foot at the lower end of its support web, a support seat on each support web vertically below *the support platform* and horizontally offset from [both] the support platform [and support foot] on the web, means defining a recess on the inner side of said upper rail extending horizontally the entire length of said upper rail and extending downwardly from the upper edge of said upper rail substantially to said support platforms, a stacking shelf, hinge means hingedly connecting said shelf to said upper rail along the lower edge of said recess for hinging movement of said shelf relative to said upper rail between a [generally vertical] stored position wherein said shelf is received within said recess *and located outwardly of the support webs* and a [generally horizontal] support position wherein said shelf lies upon said support platforms in vertical alignment with said [stacking] *support* feet whereby the [stacking] *support* feet of a like container may be supported on said shelf when said shelf is in said support position to establish a high stacked relationship and may be supported on said support seats when said shelf is in said stored position and said like container is in a first orientation to the one container, [said upper rail being engageable with said shelf] *said like container being supportable upon the one container in a fully nested position* when said shelf is in said stored position and said like container is in a second orientation reversed from said first orientation.

2. The invention defined in claim 1 further comprising side walls fixedly secured to and projecting upwardly from said bottom along two opposed sides thereof, said side walls including upper side rails fixedly secured to and extending between the ends of said upper rails of said end walls, and means at each end of each of said upper side rails at the inner side thereof defining a support platform adapted to engage and support the adjacent end of the shelf on the adjacent end wall when said shelf is in its support position.

3. The invention defined in claim 1 wherein the support webs on said end wall are uniformly inclined in their extent between their support feet and support seats with the webs on one wall inclined in a direction opposite to the inclination of the opposed support webs on the opposite end wall and with the support seats on one end wall transversely aligned with the support feet of the other; whereby, when said shelves are in their stored position, two like containers may be stacked in a fully nested relationship by locating like end walls of said two containers in vertical alignment with each other or alternatively stacked in a partially nested relationship by locating the end walls of the two containers in a like end wall to unlike end wall vertical relationship with the [stacking] *support* feet of the upper container supported on the [stacking] *support* seats of the lower container.

4. The invention defined in claim 3 wherein each of said shelves comprises an elongate main web of substantive thickness, hinge means coupled to said main webs along one longitudinal edge thereof to establish the hinge connection between said shelf and said upper rail, and a flange along the opposite longitudinal edge of said main web projecting upwardly above the upper surface of said main web when the shelf is in its support position and adapted to overhang the upper edge of said upper rail when the shelf is in its stored position, and detent means for releasably retaining said shelf in said stored position.

5. The invention defined in claim 1 wherein said hinge means comprises an elongate hinge pin mounted on said upper rail and a plurality of longitudinally spaced gudgeons integrally formed on a longitudinal edge of said shelf, said pin passing through said gudgeons to define the axis of hinging movement of said shelf relative to said upper rail, at least one of said gudgeons having a radially projecting, longitudinally extending rib on its outer surface, said platform having an upwardly projecting lip thereon located to partially underlie and support said rib on said one of said gudgeons when said shelf is in said stored position to define a detent releasably retaining said shelf in said stored position.

6. The invention defined in claim 5 wherein said one of said gudgeons is located midway between the opposite ends of said shelf, and means defining an opening through said upper rail extending downwardly from the upper edge thereof in longitudinal alignment with said one of said gudgeons.

* * * * *

UNITED STATES PATENT OFFICE

CERTIFICATE OF CORRECTION

Patent No. Re.32,223 Dated 8/12/86

Inventor(s) Elsmer W. Kreeger & Edward L. Stahl

It is certified that error appears in the above-identified patent and that said Letters Patent are hereby corrected as shown below:

Column 2, line 38, delete "5" and insert --4--.

Column 2, line 68, delete "54" and insert --34--.

Column 3, line 39, delete "48" and insert --47--.

Column 3, line 42, delete "46" and insert --47--.

Column 3, line 45, delete "46" and insert --47--.

Column 4, line 11, delete "58" and insert --68--.

Column 4, line 26, after "50" insert --and 56--.

Column 5, line 10, after "50" insert --and 56--.

In The Drawings:

Fig. 3, change reference numeral 48 to 46.

Fig. 4, change reference numeral 46 to 47.

Fig. 4, add reference numeral 26 and corresponding leader line.

Fig. 4, add section line 7-7.

Fig. 5, add reference numeral 56 and corresponding leader line.

Fig. 5, delete section line 7-7.

Fig. 7, add reference numeral 82 and corresponding leader line.

UNITED STATES PATENT OFFICE

CERTIFICATE OF CORRECTION

Patent No. Re.32,223 Dated 8/12/86

Inventor(s) Elsmer W. Kreeger & Edward L. Stahl

It is certified that error appears in the above-identified patent and that said Letters Patent are hereby corrected as shown below:

Fig. 7, delete reference numeral 46 and insert 47.

Fig. 7, delete reference numeral 80 and insert 88.

Fig. 8, delete reference numeral 24 and insert 22.

Fig. 8, change reference numeral 66 to reference numeral 76.

Fig. 8, add reference numeral 28 and corresponding leader line.

Fig. 8, delete cross hatching in center of cut.

Fig. 9, change reference numeral 66 to reference numeral 76.

Fig. 9, change reference numeral 50 to reference numeral 56.

Signed and Sealed this

Thirteenth Day of January, 1987

*Attest:*

DONALD J. QUIGG

*Attesting Officer*

*Commissioner of Patents and Trademarks*

UNITED STATES PATENT OFFICE

CERTIFICATE OF CORRECTION

Patent No. Re.32,223 Dated 8/12/86

Inventor(s) Elsmer W. Kreeger & Edward L. Stahl

It is certified that error appears in the above-identified patent and that said Letters Patent are hereby corrected as shown below:

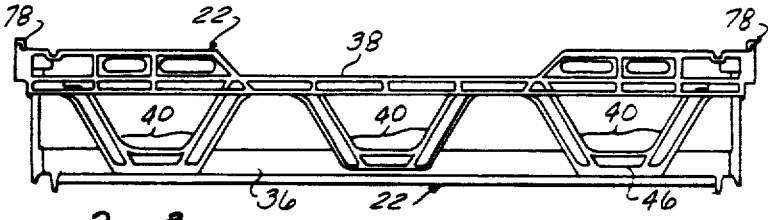

Fig-3

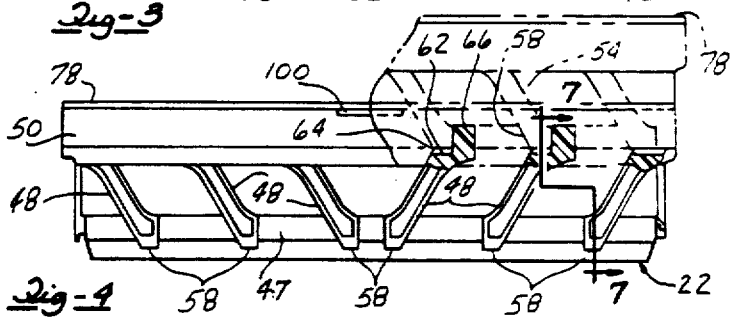

Fig-4

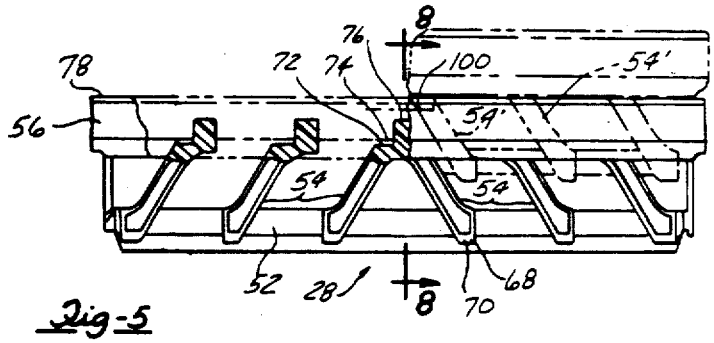

Fig-5

CERTIFICATE OF CORRECTION

Patent No. Re.32,223 Dated 8/12/86

Inventor(s) Elsmer W. Kreeger & Edward L. Stahl

It is certified that error appears in the above-identified patent and that said Letters Patent are hereby corrected as shown below:

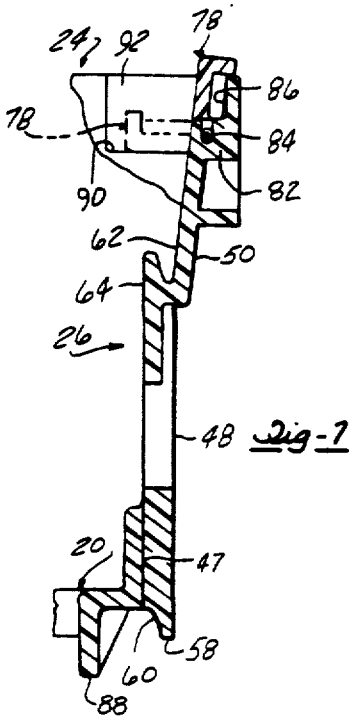

Fig-7

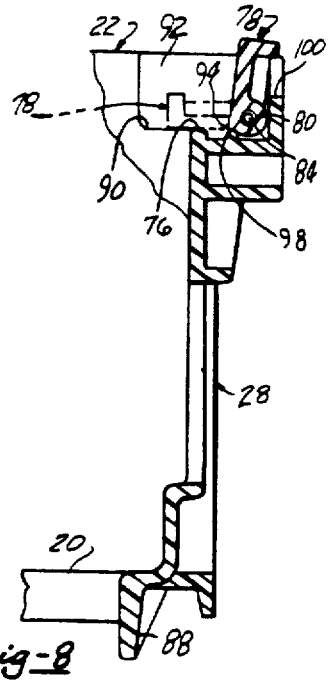

Fig-8

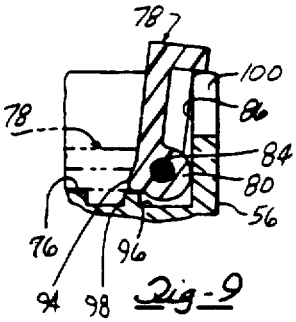

Fig-9